(12) United States Patent
Guo

(10) Patent No.: US 11,540,503 B2
(45) Date of Patent: *Jan. 3, 2023

(54) INSECT VACUUM AND TRAP ATTACHMENT SYSTEMS

(71) Applicant: Tony Guo, Los Angeles, CA (US)

(72) Inventor: Tony Guo, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,935

(22) Filed: Dec. 17, 2020

(65) Prior Publication Data

US 2021/0120803 A1 Apr. 29, 2021

Related U.S. Application Data

(63) Continuation of application No. 16/156,486, filed on Oct. 10, 2018, now Pat. No. 10,881,094, which is a continuation of application No. 62/571,193, filed on Oct. 11, 2017.

(51) Int. Cl.
*A01M 3/00* (2006.01)
*A01M 1/06* (2006.01)

(52) U.S. Cl.
CPC .............. *A01M 3/005* (2013.01); *A01M 1/06* (2013.01); *A01M 2200/011* (2013.01)

(58) Field of Classification Search
CPC .......... A01M 1/06; A01M 3/00; A01M 3/005; A01M 2200/011
USPC .......................................................... 43/139
See application file for complete search history.

(56) References Cited

U.S. PATENT DOCUMENTS

| | | | |
|---|---|---|---|
| 1,148,910 | A | 8/1915 | Baron |
| 1,797,557 | A | 3/1931 | Stine |
| 2,879,620 | A | 7/1956 | McGinnis |
| 2,893,161 | A | 7/1959 | Reid |
| 3,020,671 | A | 2/1962 | Potter |
| 3,750,327 | A | 8/1973 | Thybault |
| 3,942,842 | A | 3/1976 | Young |
| 3,965,608 | A | 6/1976 | Schuman |
| 4,074,458 | A | 2/1978 | Catlett |
| 4,488,331 | A | 12/1984 | Ward |
| 4,607,451 | A | 8/1986 | Jarecki |
| 4,733,495 | A | 3/1988 | Winnicki |
| 4,780,986 | A | 11/1988 | Broomfield |
| 4,794,725 | A | 1/1989 | Numerick |
| 4,825,582 | A | 5/1989 | Szynal |

(Continued)

FOREIGN PATENT DOCUMENTS

| | | |
|---|---|---|
| CA | 2015748 | 10/1991 |
| CN | 201451125 | 5/2010 |

(Continued)

*Primary Examiner* — Brady W Frazier

(57) ABSTRACT

An insect vacuum and trap attachment system can include a tubular member having an elongate channel that extends along an outer surface of the tubular member. The system can also include a suction member that slideably receives the tubular member. The suction member can have a narrowed open tip that receives insects and a stem that extends along at least an outer surface of the suction member. The stem can be slideably received by the elongate channel to enable the suction member to slide with respect to the tubular member. The system can include a catch that protrudes from the stem. The catch may be arranged and configured to receive a portion of an insect filter pod and thereby couple the insect filter pod between the tubular member and the suction member.

20 Claims, 6 Drawing Sheets

(56) References Cited

U.S. PATENT DOCUMENTS

| | | |
|---|---|---|
| 4,850,133 A | 7/1989 | Burzdak |
| 4,856,226 A | 8/1989 | Taylor |
| 4,858,376 A | 8/1989 | Reed |
| 4,918,857 A | 4/1990 | Wade |
| 4,979,330 A | 12/1990 | Rorant |
| 5,052,147 A | 10/1991 | Broomfield |
| 5,060,339 A | 10/1991 | Evers |
| 5,116,219 A | 5/1992 | Zimmerman |
| 5,367,821 A | 11/1994 | Ott |
| 5,410,775 A | 5/1995 | Frazier |
| 5,537,777 A | 7/1996 | Geeting |
| 5,722,111 A | 3/1998 | Sowell |
| 5,768,748 A | 6/1998 | Silvera |
| 5,915,950 A | 6/1999 | Kleinhenz |
| 6,226,919 B1 | 5/2001 | Septer |
| 6,574,915 B1 | 6/2003 | Allen |
| 6,640,489 B1 | 11/2003 | Boulton |
| 7,404,269 B2 | 7/2008 | Collins |
| 7,565,764 B2 | 7/2009 | Collins |
| 7,654,034 B2 | 2/2010 | Russik |
| 7,739,829 B2 | 6/2010 | Chen |
| 8,074,395 B2 | 12/2011 | Jancic |
| 8,276,313 B2 | 10/2012 | Reime |
| 8,359,706 B2 | 1/2013 | Watzke |
| 8,640,381 B2 | 2/2014 | Al-Qaffas |
| 8,667,731 B2 | 3/2014 | Panella |
| 8,701,338 B1 | 4/2014 | Walsh |
| 10,022,026 B2 | 7/2018 | Price |
| 2004/0107632 A1 | 6/2004 | Wyers |
| 2005/0246945 A1 | 11/2005 | Evink |
| 2006/0248786 A1 | 11/2006 | Wolf |
| 2007/0169403 A1 | 7/2007 | Collins |
| 2008/0040967 A1 | 2/2008 | Young |
| 2008/0127549 A1 | 6/2008 | Russik |
| 2009/0313881 A1 | 12/2009 | Troutman |
| 2009/0313884 A1 | 12/2009 | Jancic |
| 2011/0088309 A1 | 4/2011 | Kitron |
| 2012/0055073 A1 | 3/2012 | Darby |
| 2013/0014429 A1 | 1/2013 | Meskouris |
| 2014/0013655 A1 | 1/2014 | Southard |
| 2014/0047759 A1 | 2/2014 | Almy |
| 2015/0020436 A1 | 5/2015 | James |
| 2020/0046186 A1 | 2/2020 | Woodbury |

FOREIGN PATENT DOCUMENTS

| | | |
|---|---|---|
| CN | 102132728 | 1/2013 |
| DE | 4217187 | 10/1992 |
| DE | 202004006039 | 9/2004 |
| DE | 102013018532 | 4/2015 |
| WO | 1999057975 | 11/1999 |
| WO | 2008118061 | 10/2008 |

INSECT VACUUM AND TRAP ATTACHMENT SYSTEMS

CROSS-REFERENCE TO RELATED APPLICATIONS

The entire contents of the following application ae incorporated by reference herein: U.S. Provisional Patent Application No. 62/571,193; filed Oct. 11, 2017; and entitled INSECT VACUUM AND TRAP ATTACHMENT SYSTEMS.

The entire contents of the following application are incorporated by reference herein: U.S. Nonprovisional patent application Ser. No. 16/156,486; filed Oct. 10, 2018; and entitled INSECT VACUUM AND TRAP ATTACHMENT SYSTEMS.

TECHNICAL FIELD

The disclosure is applicable to vacuums, and more specifically to insect vacuums and trap attachments.

BACKGROUND

Insects, such as spiders, are often considered unwelcome visitors in and around homes and buildings. Typically people don't want to come into contact with insects, and instead want a quick and easy way to remove them from the premises. Accordingly, there exists a need for systems that provide a way to collect insects and rid them from indoor and outdoor spaces without direct contact.

SUMMARY

The disclosure describes an insect vacuum and trap attachment system arranged and configured to couple to a vacuum. The system can include a tubular member elongate along a first direction, the tubular member having a first open end, a second open end opposite the first open end, an elongate sidewall that extends between the first open end and the second open end, and an elongate channel that extends along an outer surface of the elongate sidewall. The system can also include a suction member that slideably receives the first open end of the tubular member, the suction member having a narrowed open tip that receives insects, a bottom open end opposite the narrowed open tip, a shortened sidewall that extends between the narrowed open tip and the bottom open end, and a stem that extends along at least an outer surface of the shortened sidewall, the stem slideably received by the elongate channel to enable the suction member to slide along the first direction with respect to the tubular member. As well, the system can include a catch protruding from the stem. The catch may be arranged and configured to receive a portion of an insect filter pod and thereby couple the insect filter pod between the tubular member and the suction member.

In some embodiments, the system further includes a retaining device coupled to both the channel and the stem, wherein the retaining device retains the suction member in close proximity to the tubular member. The retaining device may comprise at least one of an elastic band and a spring. The system may also include an insect filter pod configured to be coupled to the catch, wherein the insect filter pod can be sized and configured to receive the insect. The insect filter pod can define a cone shape, and the insect filter pod can have a filter surface that extends over the cone shape to thereby define an internal portion of the insect filter pod.

Even still, the system can define an opened position whereby the suction member is located away from the tubular member along the first direction, and a closed position whereby the suction member is located adjacent the tubular member. In some embodiments, the catch defines a triangular-shape protruding from a lower portion of the stem. Additionally, in some embodiments, when the system moves between the opened position and the closed position, the tubular member moves the insect filter pod toward the suction member along the first direction. The insect filter pod may physically contact both the tubular member and the suction member when the system is in the closed position.

The insect filter pod may define at least one slit on the filter surface to thereby provide an opening to the internal portion of the insect filter pod. In some embodiments, the insect filter pod comprises a tip located opposite the at least one slit. The at least one slit can be arranged and configured to move between a first position and a second position. In the first position the at least one slit may be substantially parallel with the filter surface to thereby substantially close off the internal portion of the insect filter pod. In the second position the at least one slit may be deflected towards the tip to thereby provide an entrance into the internal portion of the insect filter pod. The at least one slit may be in the first position when the at least one slit is exposed to a first airflow, and the at least one slit may be in the second position when the at least one slit is exposed to a second airflow. In some embodiments, the second airflow is greater than the first airflow.

The filter surface may define a filter outer diameter that is wider than an outer diameter of the tubular member and an outer diameter of the suction member such that when the suction member is retained against the tubular member the insect filter pod is retained in place with respect to the suction member and the tubular member. In some embodiments, the system includes a knob coupled to the stem. The knob can be arranged and configured to allow a person to push on the knob and move the suction member along the first direction with respect to the tubular member. The catch may be located between the suction member and the knob along the first direction whether the system is in the closed position or the opened position.

The first open end may define a tapered portion having an outer diameter that is less than an outer diameter of the second open end. In some embodiments, the suction member defines two separate pieces comprising a suction member having the narrowed open tip, a widened open end opposite the narrowed open tip, and a telescoping sidewall that extends between the narrowed open tip and the widened open end; and a shortened tubular member having the bottom open end, a top open end opposite the bottom open end, and the shortened sidewall that extends between the bottom open end and the top open end that slideably receives the widened open end. The bottom open end may define a bottom outer diameter and the top open end may define a top outer diameter. In some embodiments, the bottom outer diameter is substantially equal to the top outer diameter.

The system may define an opened position whereby the suction member is located away from the tubular member along the first direction, and a closed position whereby the suction member is located adjacent the tubular member. The catch may be arranged and configured to push the insect filter pod out of the system when the system is in the opened position.

The system may include a channel post located at a bottom end of the channel whereby the channel post extends along a second direction that is perpendicular to the first direction. The channel post may be arranged and configured to receive the retaining device. The system may also include a stem post located at a bottom end of the stem whereby the stem post extends along the second direction. The stem post may be arranged and configured to receive the retaining device. The channel may be arranged and configured such that the stem slides along an internal portion of the channel and the retaining device extends along the internal portion of the channel.

The tubular member may include an inclined ramp located along an inner surface of the tubular member. The inclined ramp may be located adjacent the second open end. The inclined ramp may be arranged and configured to accommodate different size external vacuum nozzles.

The insect filter pod may comprise flushable paper that breaks up when exposed to water. The flushable paper may be sewer and septic safe.

The embodiments described above include many optional features and aspects. Features and aspects of the embodiments can be combined.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
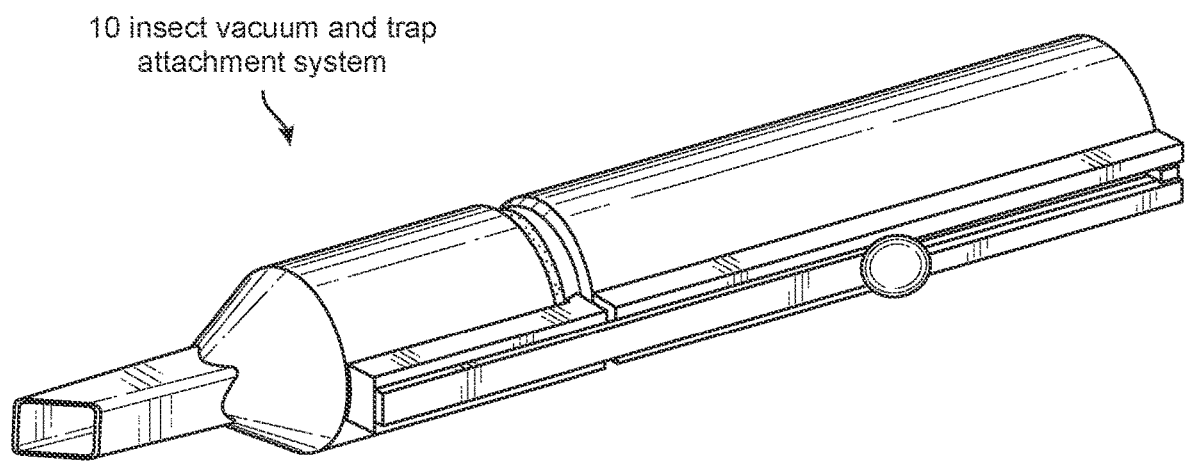
FIG. 1 illustrates a perspective view of an insect vacuum and trap attachment system, according to an embodiment.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. All such aspects or advantages are not necessarily achieved by any particular embodiment. For example, various embodiments may be carried out in a manner that achieves or optimizes one advantage or group of advantages as taught herein without necessarily achieving other aspects or advantages as may also be taught or suggested herein.

INTRODUCTION

An objective of the present invention is to provide a system that quickly and easily gathers insects without the need for direct contact. One of the embodiments described herein is an insect vacuum and trap attachment system that attaches to a standard household vacuum cleaner and handheld vacuum. The system may receive vacuum power from the vacuum cleaner to draw in and trap insects. The system can include various features that allow a user to quickly and easily discard the insect from the system. The teachings of this disclosure will not be limited to vacuum embodiments and can be implemented in a variety of other systems.

LIST OF REFERENCE NUMERALS

10—Insect vacuum and trap attachment system
12—Tubular member
14—First open end
16—Second open end
18—Elongate sidewall
20—Elongate channel
22—Outer surface of elongate sidewall
24—Suction member
24b—Tip member
24b—Shortened tubular member
26—Narrowed open tip
28—Bottom open end
30—Shortened sidewall
32—Stem
33—Lower portion of stem
34—Outer surface of shortened sidewall
36—Catch
42—Retaining device
44—Insect filter pod
46—Cone shape
48—Filter surface
50—Internal portion
52—Opened position
54—Closed position
56—At least one slit
57—Tip
58—Opening
59—First position
60—Filter outer diameter
61—Second position
62—Outer diameter of tubular member
64—Outer diameter of suction member
66—Knob
68—Tapered portion
70—Suction portion
72—Widened open end
74—Telescoping sidewall 78—Top open end
80—Channel post
82—Stem post
84—Inclined ramp System Embodiments As illustrated in FIG. 1, the disclosure includes an insect vacuum and trap attachment system 10 arranged and configured to capture household pests including, but not limited to, insects. The system 10 can be attached to a standard vacuum cleaner whereby the vacuum force travels through the entire system 10 and allows the insects to be drawn into the system 10 for capture and removal.

Figure 2:
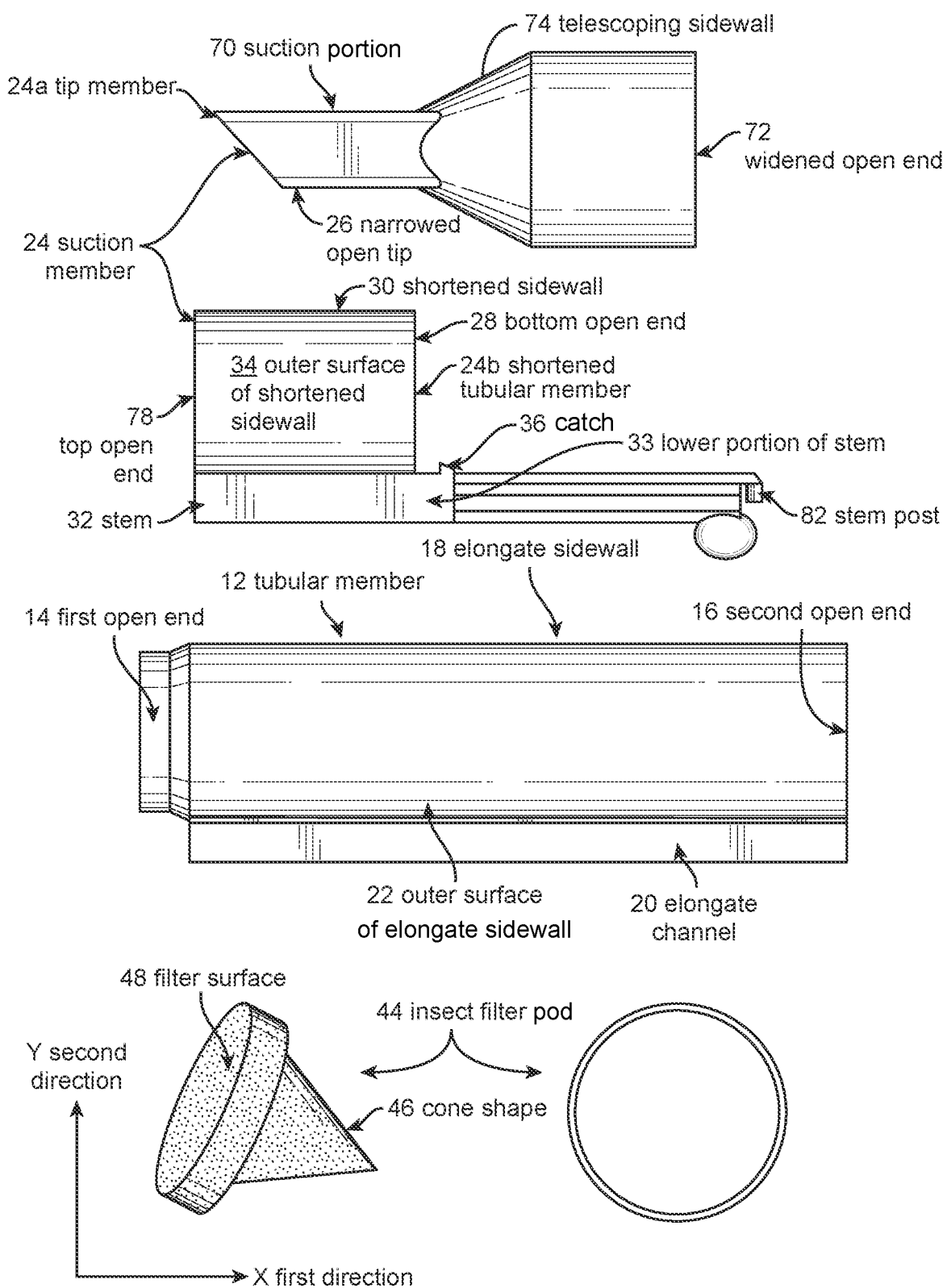
FIG. 2 illustrates a front view of various components of an insect vacuum and trap attachment system, according to an embodiment.

As shown in FIG. 2, the system 10 can include a tubular member 12, a suction member 24 slideably coupled to the tubular member 12, and an insect filter pod 44, which can serve as the device that ultimately collects the insect(s). The suction member 24 can slide away from the tubular member 12 whereby the catch 36 ejects the insect filter pod 44 to remove and discard the insect filter pod 44 with the captured insect(s). Described differently, the tubular member 12 may slide away from the suction member 24 to remove the insect filter pod 44 with the captured insect(s).

With continued reference to FIG. 2, the tubular member 12 can be implemented as an elongate tube that extends along a first direction X. In order to promote vacuum airflow through the tubular member 12, the tubular member 12 can include a first open end 14, a second open end 16 opposite the first open end 14, and an elongate sidewall 18 that extends between the first open end 14 and the second open end 16. When the system 10 is fully assembled, the second open end 16 of the tubular member 12 can be slideably coupled to a nozzle of a standard vacuum cleaner. The system 10 can then be coupled to the vacuum cleaner nozzle by a friction fit between the second open end 16 and the vacuum cleaner nozzle.

The friction fit between the second open end 16 of the tubular member 12 and the vacuum cleaner nozzle may be accomplished by the inclined ramp 84 located along an inner surface of the tubular member 12. As the nozzle slides into the tubular member 12 the nozzle can physically contact the inclined ramp 84 whereby the friction between the nozzle and the inclined ramp 84 retains the nozzle in place with respect to the tubular member 12. The length and gradual angle of the inclined ramp 84 may allow the system 10 to receive and couple to many different size vacuum nozzles.

To describe the insect filter pod 44, we now refer to FIGS. 2, 3A, 3B, and 4A. In some embodiments, the insect filter pod 44 defines a cone shape 46 having a tip 57. The insect filter pod 44 can further include a filter surface 48 that extends over the cone shape 46 to define an internal portion 50 of the insect filter pod 44.

Figure 3A:
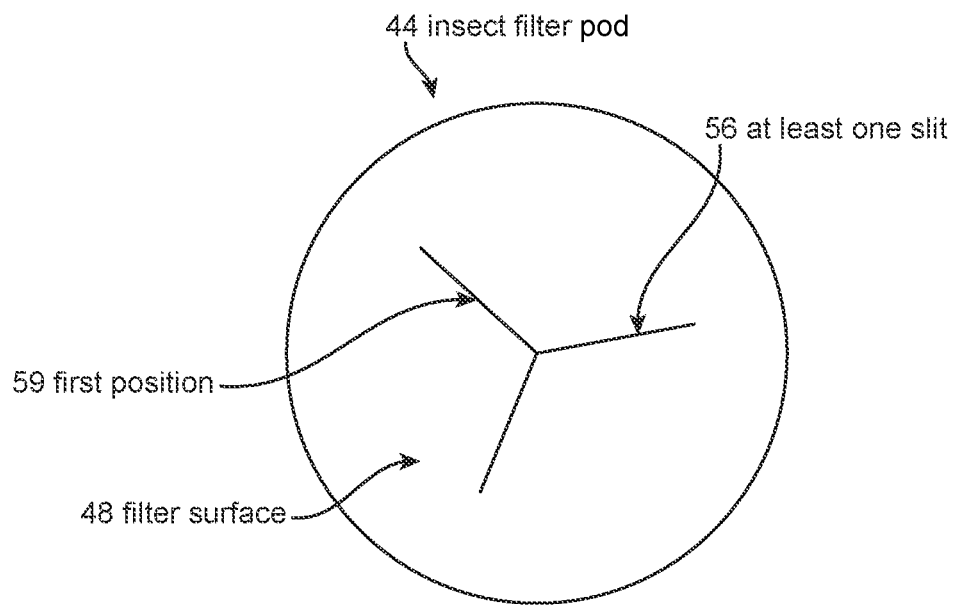
FIGS. 3A and 3B illustrate front views of insect filter pods, according to various embodiments.
Figure 3B:
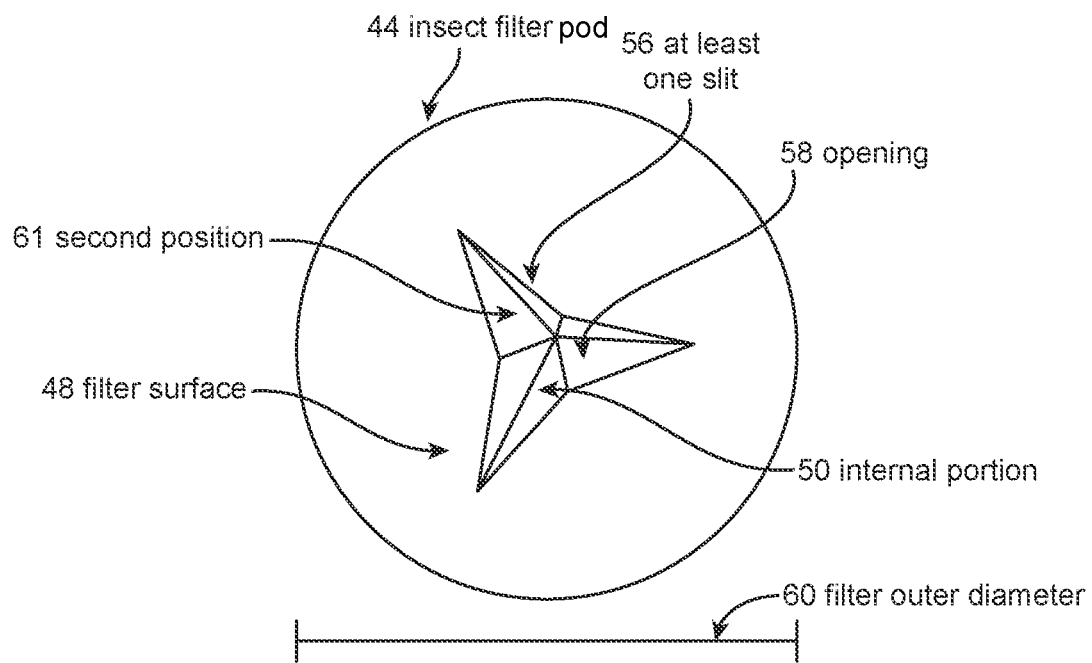

With specific reference to FIGS. 3A and 3B, the insect filter pod 44 can include at least one slit 56 located on the filter surface 48 whereby the slit 56 provides an opening 58 to the internal portion 50 of the insect filter pod 44. In some embodiments, the slit 56 can be arranged and configured to move between a first position 59 and a second position 61. FIG. 3A illustrates the slit 56 in the first position 59 where the slit 56 is substantially parallel with the remaining portion of the filter surface 48. Accordingly, when the slit 56 is in the first position 59, the internal portion 50 is substantially closed so insects cannot enter or exit the internal portion 50.

FIG. 3B illustrates the slit 56 in the second position 61 whereby the slit 56 is deflected towards the tip 57 to provide an access point (i.e. entrance and/or exit) for insects into the internal portion 50. Consequently, when the slit 56 is in the second position 61, the internal portion 50 is substantially open so insects can be drawn, by the vacuum power of the vacuum cleaner, into the internal portion 50.

In some embodiments, the slit 56 moves to the first position 59 when the slit 56 is exposed to a first airflow. Likewise, in some embodiments, the slit 56 moves to the second position 61 when the slit 56 is exposed to a second airflow that is greater than the first airflow. Described differently, the slit 56 can move to the second position 61 when air travels through the filter pod 44 from the filter surface 48 to the tip 57, which can be caused by the vacuum power from the vacuum cleaner. On the other hand, the slit 56 can move to the first position 59 when no airflow or less airflow (than in the second position 61) travels across the slit 56. In this regard, the slit 56 of the insect filter pod 44 can act as a live access point that moves between the first position 59 (closed) and the second position 61 (open) under the vacuum power of the vacuum cleaner.

The insect filter pod 44 can be constructed of disposable material, such as flushable paper that breaks up when exposed to water. In some embodiments, the flushable paper is sewer and septic safe. Even still, the filter 44 may be constructed of compostable material that can allow the filter 44 to be deposited outdoors. In such embodiments, the insect may be released into its natural environment and the filter 44 can break down into organic elements.

Figure 4A:
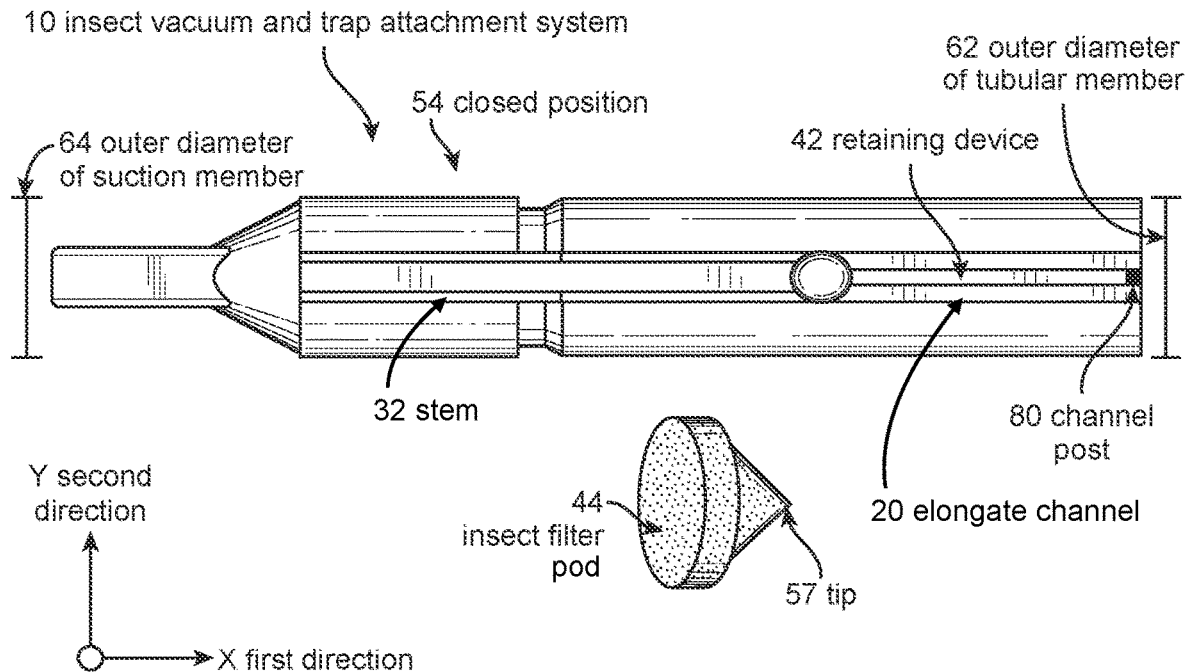
FIG. 4A illustrates a bottom view of an insect vacuum and trap attachment system in a closed position, according to an embodiment.
Figure 4B:
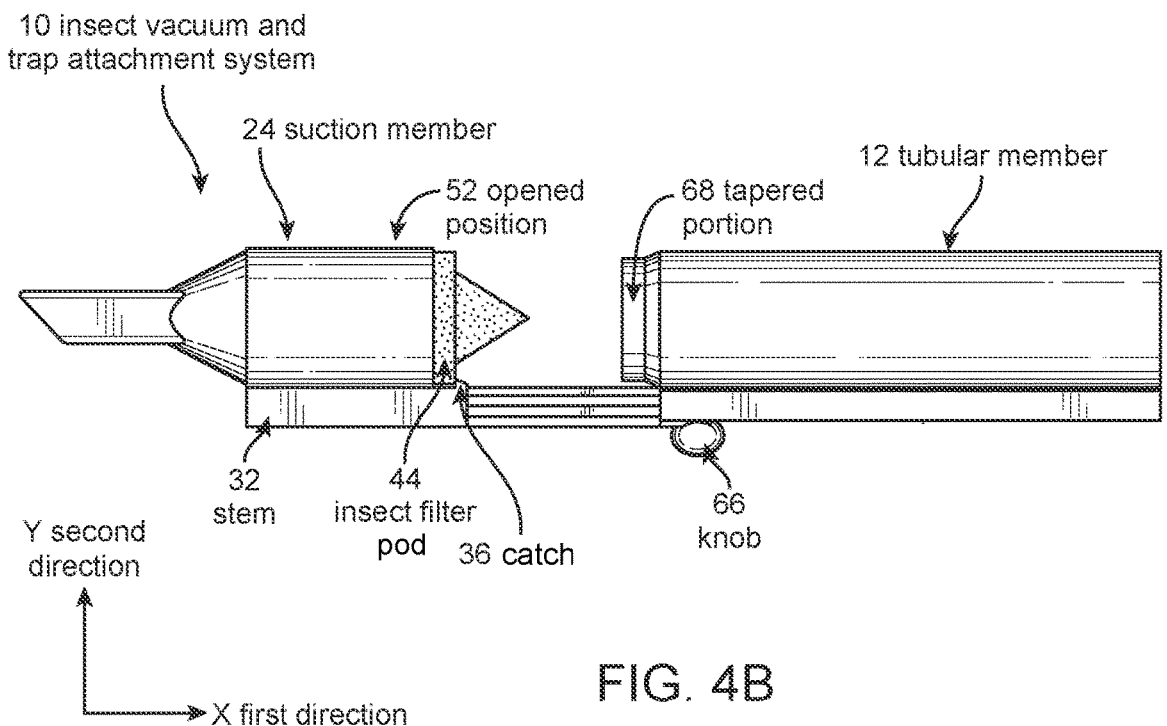
FIG. 4B illustrates a side view of an insect vacuum and trap attachment system in an opened position, according to an embodiment.

In order to describe the various components and how they interconnect, we will now refer to FIGS. 2, 4A and 4B. The first open end 14 of the tubular member 12 may be coupled to the bottom open end 28 of the suction member 24. Furthermore, the first open end 14 can define a tapered portion 68 having an outer diameter that is less than an outer diameter of the bottom open end 28. In this regard, the tapered portion 68 of the first open end 14 may be tapered so that it can be received along an internal portion of the bottom open end 28 of the suction member 24. The tapered portion 68 may allow for a tighter connection between the tubular member 12 and the suction member 24 to minimize leaks between the tubular member 12 and the suction member 24.

In some embodiments, the suction member 24 can be implemented as one contiguous piece. Alternatively, the suction member 24 can also be implemented as two separate pieces. In two piece embodiments, the first piece may be a tip member 24*b* having a narrowed open tip 26, a widened open end 72 opposite the narrowed open tip 26, and a telescoping sidewall 74 that extends between the narrowed open tip 26 and the widened open end 72. The telescoping sidewall 74 may allow the narrowed open tip 26 and the suction portion 70 to move away from the widened open end 72 along the first direction X. In this manner, the telescoping sidewall 74 may allow the entire tip member 24*b* to lengthen or shorten. However, in some embodiments, the telescoping sidewall 74 is a sidewall that is static and does not move, meaning that the tip member 24*b* is not able to extend or lengthen with respect to the widened open end 72. The second piece may be a shortened tubular member 24*b* having the bottom open end 28, a top open end 78 opposite the bottom open end 28, and the shortened sidewall 30 that extends between the bottom open end 28 and the top open end 78. The top open end 78 may slideably receive the widened open end 72 of the tip member 24*a*. In some embodiments, the bottom open end 28 defines a bottom outer diameter and the top open end 78 defines a top outer diameter. In some embodiments, the bottom outer diameter is substantially equal to the top outer diameter. However, the bottom outer diameter can be greater than or less than the top outer diameter.

The tubular member 12 may include an elongate channel 20 that extends along an outer surface 22 of the elongate sidewall 18. In some embodiments, the suction member 24 can also include a stem 32 that extends along at least an outer surface 34 of the shortened sidewall 30. The stem 32 may be arranged and configured to slideably engage the elongate channel 20 to enable the suction member 24 to slide along the first direction X with respect to the tubular member 12. Stated differently, the elongate channel 20 may slideably receive the stem 32 to thereby permit the suction member 24 to slide with respect to the tubular member 12 to open and close the system 10.

In some embodiments, the catch 36 protrudes from the stem 32. In many embodiments, the catch 36 can slide with the suction member 24 and move with respect to the tubular member 12. As such, when a user moves the suction member 24 away from the tubular member 12, the catch 36 (or "hook") may eject the insect filter pod 44 out of the system 10 to thereby discard the insect filter pod 44. Conversely, when the system 10 moves from the opened position toward the closed position, the tubular member 12 may move the insect filter pod 44 toward the suction member 24 along the first direction X. In this regard, the insect filter pod 44 physically contacts both the tubular member 12 and the suction member 24 when the system 10 is in the closed position 54. In some embodiments, the catch 36 defines a triangular-shape protruding from a lower portion of the stem 33.

In many embodiments, the suction member 24 slideably receives the tubular member 12 so that that the two members slide towards and away from each other. The slideable connection between the tubular member 12 and the suction member 24 can thereby allow for easy loading and unloading of the insect filter pod 44. In order to load and remove the insect filter pod 44, the system 10 can move between a closed position 54 and an opened position 52. As shown in FIG. 4A, when the system 10 is in the closed position 54, the tubular member 12 can be located adjacent or in physical contact with the suction member 24. In this manner, the insect filter pod 44 can be retained in place within the catch 36 and airflow is able to flow from the suction portion 70 through the insect filter pod 44 and through entire tubular member 12. Alternatively, as shown in FIG. 4B, when the system 10 is in the opened position 52, the suction member 24 can be located away from the tubular member 12 along the first direction X. In this manner, when the system 10 moves between the closed position 54 and the opened position 52 the insect filter pod 44 can be easily removed from the system and discarded, if necessary. Moreover, when the system 10 is in the opened position 52 airflow is not able to flow from the suction portion 70 through the rest of the system 10.

Figure 5A:
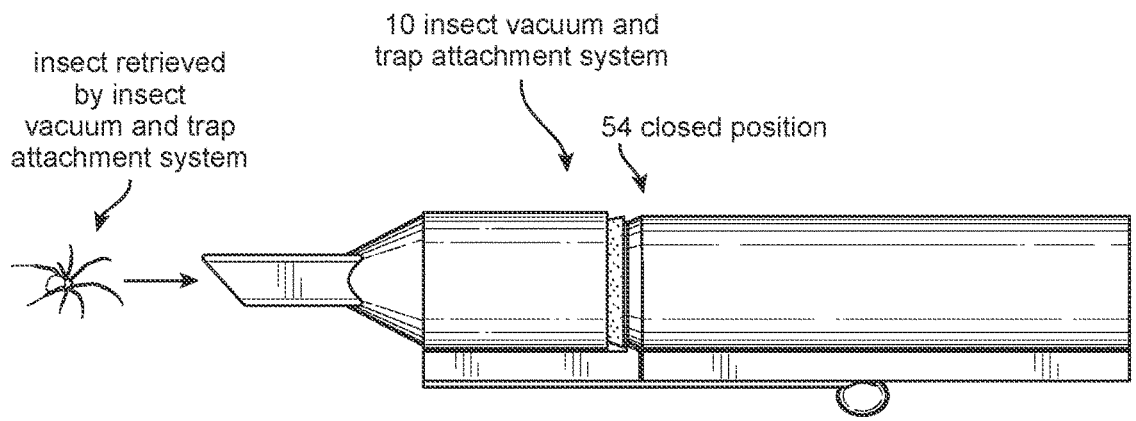
FIG. 5A illustrates a side view of an insect vacuum and trap attachment system in a closed position, according to an embodiment.
Figure 5B:
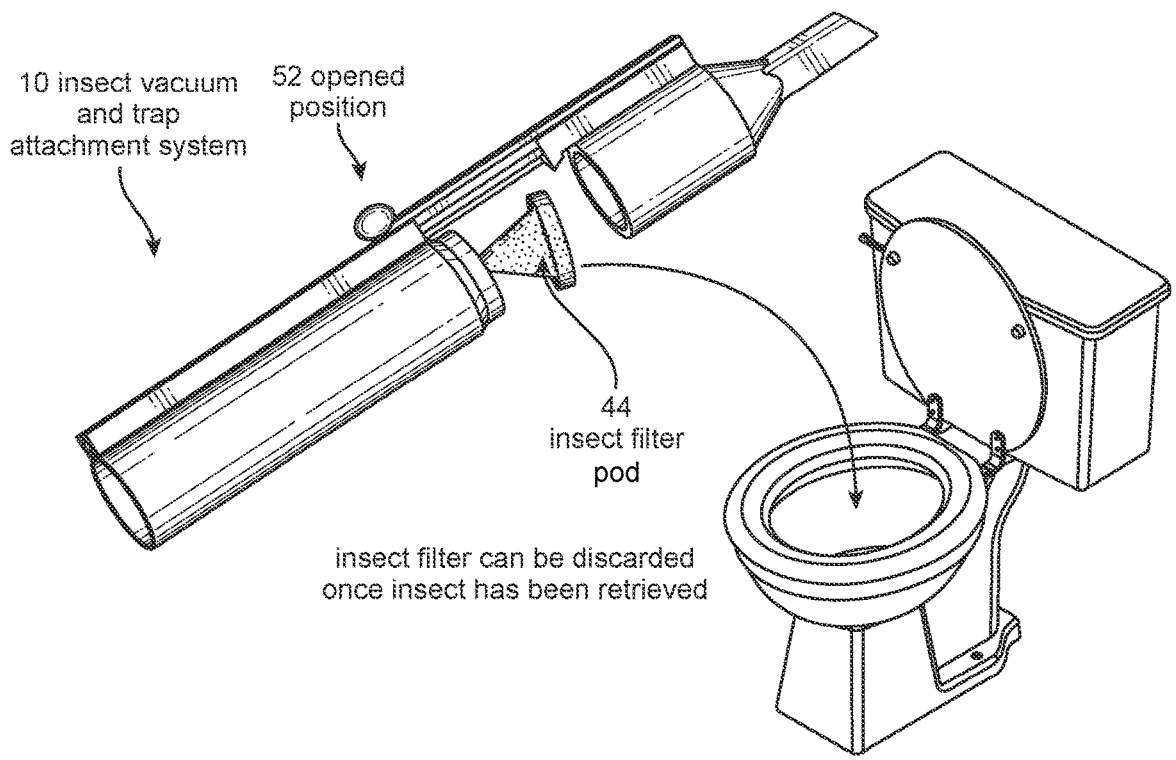
FIG. 5B illustrates a perspective view of an insect vacuum and trap attachment system in an opened position, according to an embodiment.
Figure 6:
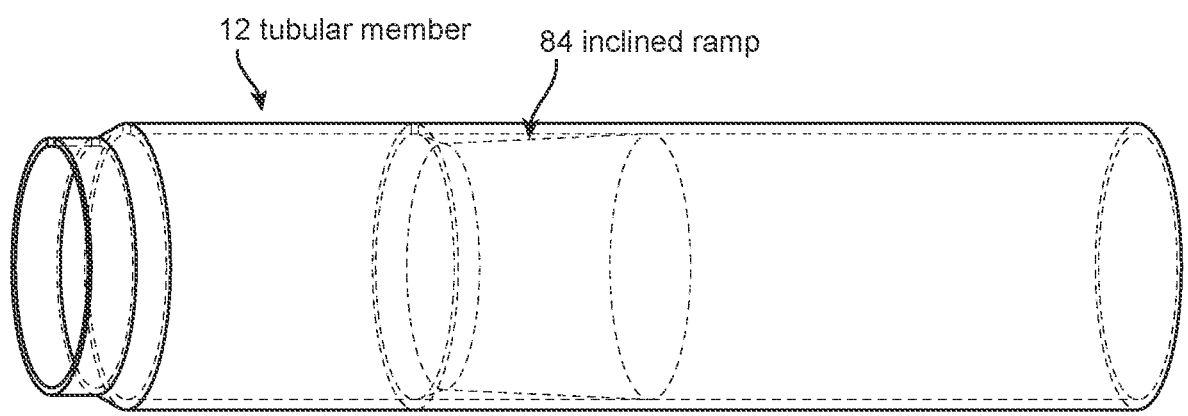
FIG. 6 illustrates a perspective view of a tubular member, according to an embodiment.

The components of the system 10 can be sized and configured to retain various components in place, such as the insect filter pod 44. In some embodiments, the filter surface 48 defines a filter outer diameter 60 that is wider than both an outer diameter 62 of the tubular member 12 and an outer diameter 64 of the suction member 24. With specific reference to FIG. 5A, when the suction member 24 comes into physical contact with the tubular member 12 the insect filter pod 44 is pressed against both the tubular member 12 and the suction member 24 to hold the insect filter pod 44 in place with respect to the suction member 24 and the tubular member 12.

To further explain the opened and closed positions 52, 54, the disclosure will now describe the component interactions when the system 10 moves between the two positions. First, when the system 10 is in the closed position 54, the insect filter pod 44 physically contacts both the tubular member 12 and the suction member 24. In other words, the insect filter pod 44 is locked in place and unable to be removed when the system 10 is in the closed position 54. When the system 10 is in the opened position 52, the insect filter pod 44 is free to move with respect to the tubular member 12 and the suction member 24. Moreover, when the system 10 moves from the closed position 54 to the opened position 52 the catch 36 moves with respect to the tubular member 12 along the first direction X, and the catch 36 may not move with respect to the suction member 24. As such, the catch 36 may thereby be arranged and configured to eject the insect filter pod 44 out of the system 10 when the system 10 is in or moves toward the opened position.

Now with reference to FIG. 4A, the system 10 can also include a retaining device 42 coupled to both the elongate channel 20 and the stem 32. The retaining device 42 can be used to retain the suction member 24 in close proximity to or in physical contact with the tubular member 12. In this regard, the retaining device 42 keeps the system 10 in a closed position 54 when no outside forces are acting upon the system 10. In some embodiments, the retaining device 42 is an elastic band, a spring, or a combination thereof.

According to FIG. 4B, in order for a user to easily move the system 10 between the closed position 54 and the opened position 52, the system 10 may include a knob 66 coupled to the stem 32. The knob 66 can be arranged and configured to allow a person to push and/or pull the knob 66 to move the suction member 24 along the first direction X with respect to the tubular member 12. In other words, the knob 66 can provide the user with a handle to move the system 10 between the closed position 54 and the opened position 52.

In some embodiments, the system 10 includes features located along one or both the tubular member 12 and the suction member 24 to receive the retaining device 42. For example, in some embodiments, the system 10 includes a channel post 80 located at a bottom end of the elongate channel 20 whereby the channel post 80 extends along a second direction Y that is perpendicular to the first direction X. The channel post 80 can be arranged and configured to receive one end of the retaining device 42.

The system 10 can also include a stem post 82 located at a bottom end of the stem 32, whereby the stem post 82 extends along the second direction Y. The stem post 82 can be arranged and configured to receive a second end of the retaining device 42. In this regard, the channel post 80 and the stem post 82 can receive respective ends of the retaining device 42 and, in doing so, can allow the retaining device 42 to naturally draw the tubular member 12 and the suction member 24 together. In some embodiments, the elongate channel 20 is arranged and configured such that the stem 32 slides along an internal portion of the elongate channel 20 and the retaining device 42 extends along the internal portion of the elongate channel 20.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain methods, events, states, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can include only A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. An insect vacuum and trap attachment system arranged and configured to couple to a vacuum, the system comprising:
   a tubular member elongate along a first direction, the tubular member having a first open end, a second open end opposite the first open end, and an elongate sidewall that extends between the first open end and the second open end, wherein the tubular member further comprises an elongate channel that extends along an outer surface of the elongate sidewall; and
   a suction member that slideably receives the first open end of the tubular member, the suction member having a narrowed open tip that receives insects, a bottom open end opposite the narrowed open tip, a shortened sidewall that extends between the narrowed open tip and the bottom open end, and a stem that extends along at least an outer surface of the shortened sidewall, the stem slideably received by the elongate channel to enable the suction member to slide along the first direction with respect to the tubular member.

2. The system of claim 1, further comprising a catch protruding from the stem, the catch arranged and configured to receive a portion of an insect filter pod and thereby eject the insect filter pod from the system.

3. The system of claim 1, wherein the elongate channel comprises a channel post, wherein the stem comprises a stem post, and wherein the channel post and the stem post are arranged and configured to be removably coupled to a retaining device so as to retain the suction member in close proximity to the tubular member.

4. The system of claim 3, further comprising the insect filter pod sized and configured to receive the insect, wherein the insect filter pod is physically located between the tubular member and the suction member when the system is in a closed position.

5. The system of claim 4, wherein the insect filter 1 pod defines a cone shape, the insect filter pod having a filter surface that extends over the cone shape to thereby define an internal portion of the insect filter pod.

6. The system of claim 5, wherein the system defines an opened position whereby the suction member is located away from the tubular member along the first direction, and a closed position whereby the suction member is located adjacent the tubular member.

7. The system of claim 6, wherein the catch defines a triangular-shape protruding from a lower portion of the stem.

8. The system of claim 7, wherein when the system moves between the opened position and the closed position, the tubular member moves the insect filter pod toward the suction member along the first direction.

9. The system of claim 8, wherein the insect filter pod physically contacts both the tubular member and the suction member when the system is in the closed position.

10. The system of claim 6, wherein when the system moves between the closed position and the opened position the catch moves with respect to the tubular member along the first direction, and the catch does not move with respect to the suction member.

11. The system of claim 5, wherein the insect filter pod defines at least one slit on the filter surface to thereby provide an opening to the internal portion of the insect filter pod.

12. The system of claim 11, wherein the insect filter pod comprises a tip located opposite the at least one slit, wherein the at least one slit is arranged and configured to move between a first position and a second position, wherein in the first position the at least one slit is substantially parallel with the filter surface to thereby substantially close off the internal portion of the insect filter pod, and in the second position the at least one slit is deflected towards the tip to thereby provide an entrance into the internal portion of the insect filter pod, wherein the at least one slit is in the first position when the at least one slit is exposed to a first airflow, and the at least one slit is in the second position when the at least one slit is exposed to a second airflow, and wherein the second airflow is greater than the first airflow.

13. The system of claim 5, wherein the filter surface defines a filter outer diameter that is wider than an outer diameter of the tubular member and an outer diameter of the suction member such that when the suction member is retained against the tubular member the insect filter pod is retained in place with respect to the suction member and the tubular member.

14. The system of claim 6, further comprising a knob coupled to the stem, the knob arranged and configured to allow a person to push on the knob and move the suction member along the first direction with respect to the tubular member, wherein the catch is located between the suction member and the knob along the first direction whether the system is in the closed position or the opened position.

15. The system of claim 3, wherein the first open end defines a tapered portion having an outer diameter that is less than an outer diameter of the second open end.

16. The system of claim 3, wherein the suction member defines two separate pieces comprising:

a tip member having the narrowed open tip, a widened open end opposite the narrowed open tip, and a telescoping sidewall that extends between the narrowed open tip and the widened open end; and a shortened tubular member having the bottom open end, a top open end opposite the bottom open end, and the shortened sidewall that extends between the bottom open end and the top open end that slideably receives the widened open end, wherein the bottom open end defines a bottom outer diameter and the top open end defines a top outer diameter, and wherein the bottom outer diameter is substantially equal to the top outer diameter.

17. The system of claim 3, wherein the system defines an opened position whereby the suction member is located away from the tubular member along the first direction, and a closed position whereby the suction member is located adjacent the tubular member, and wherein the catch is arranged and configured to push the insect filter pod out of the system when the system is in the opened position.

18. The system of claim 3, wherein the retaining device comprises at least one of an elastic band and a spring, the system further comprising:

the channel post located at a bottom end of the elongate channel whereby the channel post extends along a second direction that is perpendicular to the first direction; and the stem post located at a bottom end of the stem whereby the stem post extends along the second direction, wherein the elongate channel is arranged and configured such that the stem slides along an internal portion of the elongate channel and the retaining device extends along the internal portion of the elongate channel.

19. The system of claim 3, wherein the tubular member comprises an inclined ramp located along an inner surface of the tubular member located adjacent the second open end, wherein the inclined ramp is arranged and configured to accommodate different size external vacuum nozzles.

20. The system of claim 4, wherein the insect filter pod comprises flushable paper that breaks up when exposed to water, and wherein the flushable paper is sewer and septic safe.

* * * * *